Feb. 22, 1938. P. J. STINE 2,109,305
CLAMP TRUCK
Filed Feb. 26, 1937
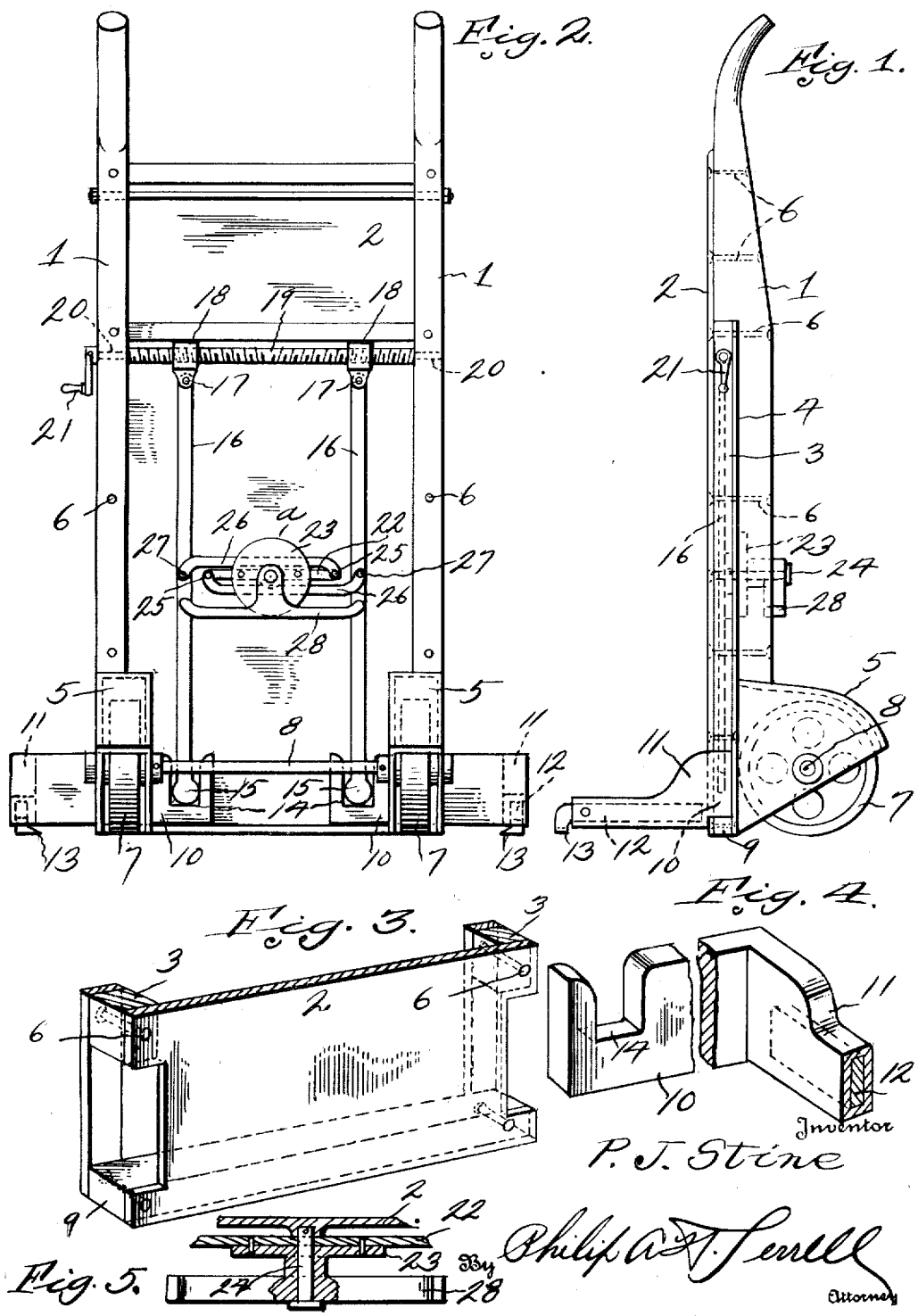

Patented Feb. 22, 1938

2,109,305

UNITED STATES PATENT OFFICE 2,109,305

CLAMP TRUCK

Paul Joseph Stine, Sanford, Fla.

Application February 26, 1937, Serial No. 127,985

3 Claims. (Cl. 214—65.5)

The invention relates to clamp trucks, and has for its object to provide a device of this character comprising a wheel supported frame having inwardly and outwardly slidably mounted gripping jaws for gripping opposite sides of a stack of receptacles, and controlled by upwardly extending arms, pivotally mounted and terminating at their upper ends in members threaded on a rotatable shaft having right and left hand thread so the arms may be simultaneously rocked in opposite directions for receiving receptacles or for gripping receptacles.

A further object is to pivotally mount the arms to links extending towards each other and overlapping and connected together by a rotatable member, by means of which the arms may be forced apart at their lower ends after an adjustment thereof, and for a receptacle gripping operation and moved together for the actual gripping.

A further object is to provide handle means carried by the rotatable member, which when moved in one direction will force the arms apart at their lower ends and when moved in the opposite direction will force the arms together at their lower ends.

A further object is to provide the lower ends of the arms with heads rockably connected to the inwardly and outwardly movable gripping bars.

A further object is to provide the forwardly extending arms of the gripping bars with extension members whereby they may be lengthened.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the truck.

Figure 2 is a rear elevation of the truck.

Figure 3 is a detail perspective view of the lower end of the truck frame.

Figure 4 is a detail perspective view of a portion of one of the gripping arms.

Figure 5 is a horizontal sectional view through the mechanism for moving the arms towards or away from each other.

Referring to the drawing, the numeral 1 designates the side bars of the truck frame and 2 a plate secured to the forward side of the truck frame. Disposed between the side bars 1 and the front plate 2 are spacer bars 3 which have secured to the rear sides thereof extension arms 4 of the wheel guards 5. All of these parts are secured together by rivets 6, thereby forming a rigid structure. Disposed within the wheel guards 5 are wheels 7, which support the hand truck as a whole, and on which it is moved from place to place. Wheels 7 are preferably mounted on an axle 8.

The lower ends of the plate 2 and the arms 4 are connected together by means of a bar 9 in spaced relation to the lower ends of the spacing bars 3, thereby forming a transverse opening, in which is guidably mounted the slide bars 10, the outer ends of which terminate in right angularly disposed arms 11, in which are adjustably mounted extension gripping arms 12, which terminate in flanged portions 13, adapted to engage under or bite into the opposite sides of a receptacle for gripping the same.

The inner ends of the bars 10 are provided with vertically elongated recesses 14, in which are rockably mounted the round heads 15 of the upwardly extending operating arms 16. The upper ends of the operating arms 16 are pivotally connected at 17 to sleeves 18 through which the right and left handed threaded operating shaft 19 extends. Shaft 19 is rotatably mounted in bearings 20 of the frame bars 1 and is provided with a crank 21, adapted to be grasped by the operator for adjusting the sleeves 18 towards and away from each other according to the size of the receptacles to be gripped. The adjustment at this point is sufficient for the receptacle gripping operation when the operating arm mechanism $a$ is in the position shown in Figure 2, that is in closed position.

The operating mechanism $a$ comprises a rotatable cross bar 22, anchored to a rotatable plate 23 and rotatably mounted on a stub shaft 24. The bar 22 is pivotally connected at 25 to oppositely extending links 26, which in turn are pivotally connected at 27 to the operating arms 16. A handle member 28 is provided on the disc 23 and adapted to be engaged by the hand or foot of the operator for forcing the arms 16 apart or towards each other at their lower ends or a receptacle gripping or releasing operation. The disc 23 also forms guide means for the links 26.

From the above it will be seen that a gripping truck is provided which is simple in construction and one wherein the upper ends of the operating arms 16 may be initially adjusted for gripping, with the least amount of movement of the gripping arms, receptacles of different widths and the actual gripping or releasing operation may be accomplished through the arm operating mechanism $a$, which also allows a wide range of adjustment.

The invention having been set forth what is claimed as new and useful is:

1. The combination with a hand truck having inwardly and outwardly movable gripping bars at the lower end thereof, of means above the bars for moving said bars inwardly and outwardly and adjusting the range of operation thereof, said means comprising operating arms pivotally and floatably mounted on the truck, the lower ends of said arms being pivotally connected to the gripping bars, a rotatable threaded shaft carried by the truck adjacent its upper end and having right and left hand threads, the upper ends of the operating arms being threadably connected to said threaded shaft, said means for adjusting the range of operation being disposed between the bars and threaded shaft.

2. A device as set forth in claim 1 whereby the means for adjusting the upper ends of the operating bars towards or away from each other comprises sleeves pivoted to the arm ends and through which the threaded shaft extends.

3. A device as set forth in claim 1 including headed members carried by the lower ends of the operating arms and rockably mounted in recesses in the upper sides of the gripping bars and having upward movement in said recesses.

PAUL JOSEPH STINE.